United States Patent [19]

Dowler et al.

[11] Patent Number: 4,825,466
[45] Date of Patent: Apr. 25, 1989

[54] TELEPHONE INTERFACE SECURITY DEVICE

[75] Inventors: David H. Dowler, Raymond; Richard K. St. John, Harrison, both of Me.

[73] Assignee: GTE Products Corporation, Stamford, Conn.

[21] Appl. No.: 82,624

[22] Filed: Aug. 7, 1987

[51] Int. Cl.⁴ .................. H04M 1/15; H04M 9/00; H01R 13/40; H01R 13/46
[52] U.S. Cl. .................................. 379/445; 379/399; 379/438; 439/133; 439/135; 439/372
[58] Field of Search ............... 379/437, 27, 399, 412, 379/419, 437, 438, 445; 439/133, 718, 709, 712, 716, 717, 722, 372, 135

[56] References Cited

U.S. PATENT DOCUMENTS

| | | | |
|---|---|---|---|
| 4,488,008 | 12/1984 | Dellinger et al. | 379/412 |
| 4,560,839 | 12/1985 | Dillard | 439/133 |
| 4,584,856 | 4/1986 | Petersdorff et al. | 439/133 |
| 4,647,725 | 3/1987 | Dellinger et al. | 439/544 |

Primary Examiner—Jin F. Ng
Assistant Examiner—Danita R. Byrd
Attorney, Agent, or Firm—James Theodosopoulos

[57] ABSTRACT

A telephone multiple pair network interface device provides a demarcation between the wiring owned by the telephone company and that owned by the customer. Security means are provided to prevent unauthorized access to the interface by other than the customer. Separate means are provided such that the telephone company has the ability to override the security means to permit testing or service of the telephone lines.

15 Claims, 5 Drawing Sheets

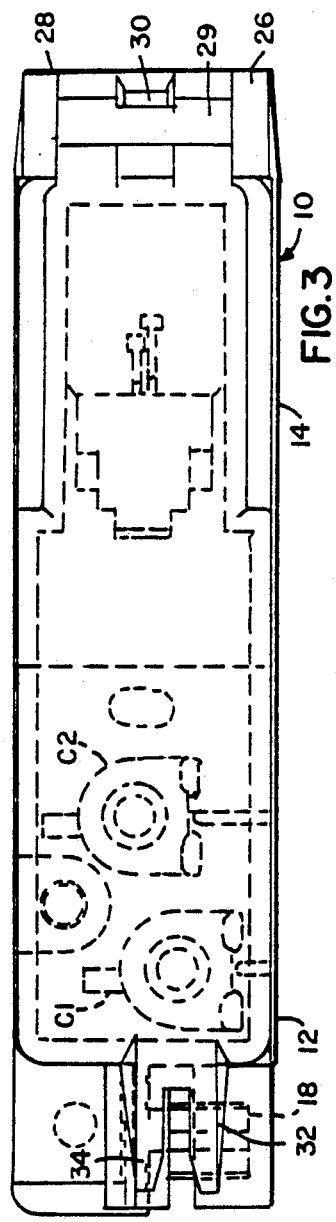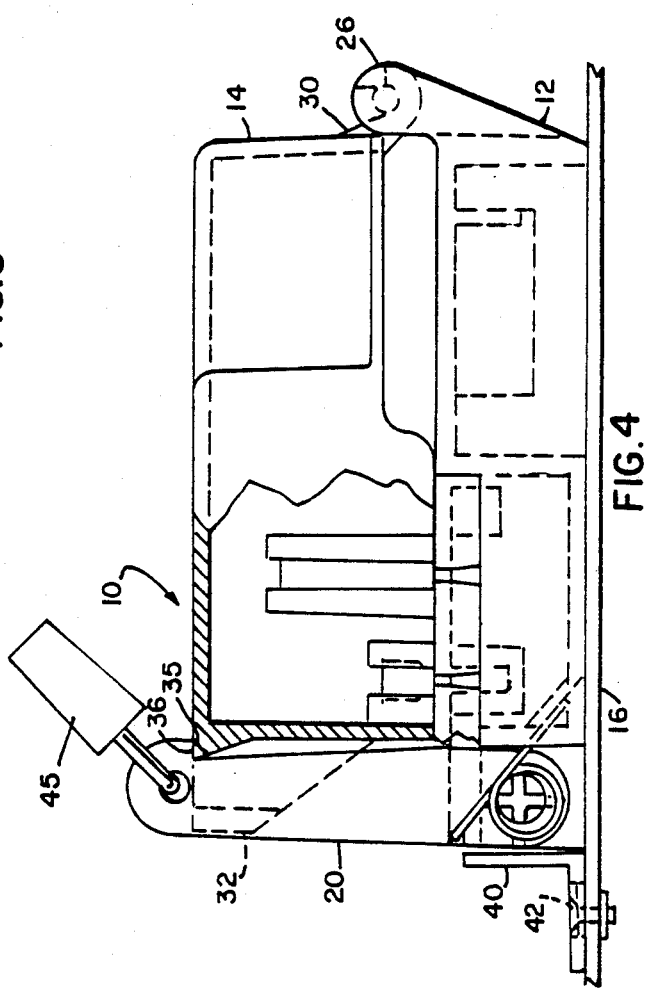

TELEPHONE INTERFACE SECURITY DEVICE

BACKGROUND OF THE INVENTION

The present invention relates to telephone interface security devices, and more particularly, to a device employed with a telephone network interface which prevents unauthorized access to the interface by other than the customer but allows the telephone company to override the security means to permit testing or other service of the telephone lines by a telephone employee.

The deregulation of the telephone industry has brought about the ownership by the subscriber of telephone equipment within his home or place of business and the requirement to provide a point of demarcation between that portion of the telephone network and that portion owned by the telephone company. This has required the provision of an interface device which can contain terminal posts and other components to connect the telephone company's network into the subscriber's home or place of business. The interface device generally is installed into a case formed of metal or plastic material, which is provided at the subscriber's site.

One such device is known as a multiple pair interface device and is designed to supersede a building entrance terminal for certain installations. A building entrance terminal is used to terminate a multiple customer telephone cable where it enters the building and provides a convenient place to install surge arresters, to cross-connect the outside and the interior wires, and to install electrical devices required to test or operate the telephone system.

In addition to the above enumerated uses, the multiple pair interface device will provide a demarcation between the wiring owned by the telephone company and that owned by the customers and also allow the customers to test their connection to the telephone network. While it is customary that only telephone company employees need access to the building entrance terminals, it is sometimes necessary that the customer also have access to the multiple pair interface device in order to perform the above mentioned tests to the particular equipment.

When there are a number of customers in the same building, there will be several different customer test jacks in the same multiple pair interface device and therefore, there is a need to provide security for each customer's test jack while allowing the telephone company employees access to each of the customer's interface terminals.

It is therefore an object of the present invention to provide a telephone network interface security device which allows each customer to restrict access to his particular test jack by employing a lock or other security device.

It is a further object of the present invention to provide a telephone network interface security device which is easy and simple to secure by the customer, and in which the telephone company may override the security device when required to test or service the telephone lines.

Another object of the invention is to provide a telephone network interface security device which is simple to manufacture and install and which does not require complex mechanisms or electronic devices to achieve the desired degree of security.

Another object of the invention is to provide a device as set forth in which the telephone company may override the customer security device and wherein the override mechanism is obscured from customer view.

Yet another object of the invention is to provide a device as set forth above in which the telephone company may override the customer security device and which will subsequently return to the secure mode without the performance of a number of steps by telephone personnel and without the need for a plurality of detachable parts which may be lost or not installed.

SUMMARY OF THE INVENTION

The above objects and other objects which will become apparent as the description proceeds are achieved by providing a telephone network interface security device comprising a storage container formed of a base portion having the bottom surface affixed to a mounting surface, and a cover portion disposed on the upper surface of the base portion. The base portion and the cover portion together form a compartment for the containment and storage of components which form the interface between the telephone company's network and the customer's telephone line. Elongated latch means is pivotably connected to one end of the base portion and extends upwardly in a first position adjacent the cover portion. Hinge means disposed at the opposite end of the base portion connects the cover portion to the base portion and flange means disposed on the cover portion extends adjacent at least one side of the latch means. Securing means is disposed on the latch means above the flange means when the latch is in a first position and the latch means further has a downwardly facing lip which extends over the cover portion when the latch means is in the first position.

A stop means is disposed adjacent the latch means in the first position, the stop means being spaced from the latch means a sufficient distance to allow the latch means to be pivotably moved away from the cover portion to a second position wherein the downwardly facing lip does not extend over the cover portion and the latch means contacts the stop means with the securing means disposed above the flange means. The stop means is further movable away from the latch means to provide a space between the stop means and the latch means wherein the latch means is pivotably movable to a third position wherein the securing means is not disposed above the flange means.

From a more detailed aspect, the latch means may comprise an elongated bar having the downwardly facing lip formed adjacent the upper end of the bar and the flange means may comprise a pair of flange members extending in parallel relation, one on either side of the elongated bar. The securing means may further comprise a wall structure in the bar forming an opening through the bar disposed above the pair of flange members for receiving a portion of a lock or other device overlying the flange members.

Additionally, a spring may be provided interconnected between the base portion and the elongated bar for biasing the elongated bar toward the cover portion.

The stop means in one embodiment may take the form of an angle member slideably retained on the mounting surface for movement toward and away from the elongated bar, while in another embodiment, the stop means may take the form of an elongated arm pivotably mounted for rotation to move the stop means toward and away from the elongated bar.

BRIEF DESCRIPTION OF THE DRAWING

The foregoing and other features of the invention will be more particularly described in connection with the preferred embodiment, and with reference to the accompanying drawing, wherein:

FIG. 3 is a top plan view of the device shown in FIG. 1 and FIG. 2 showing further details of the invention;

FIG. 4 is a side elevational view of the structure shown in FIGS. 1 through 3, showing the telephone network interface security device in use;

DESCRIPTION OF THE PREFERRED EMBODIMENT

Figure 1:
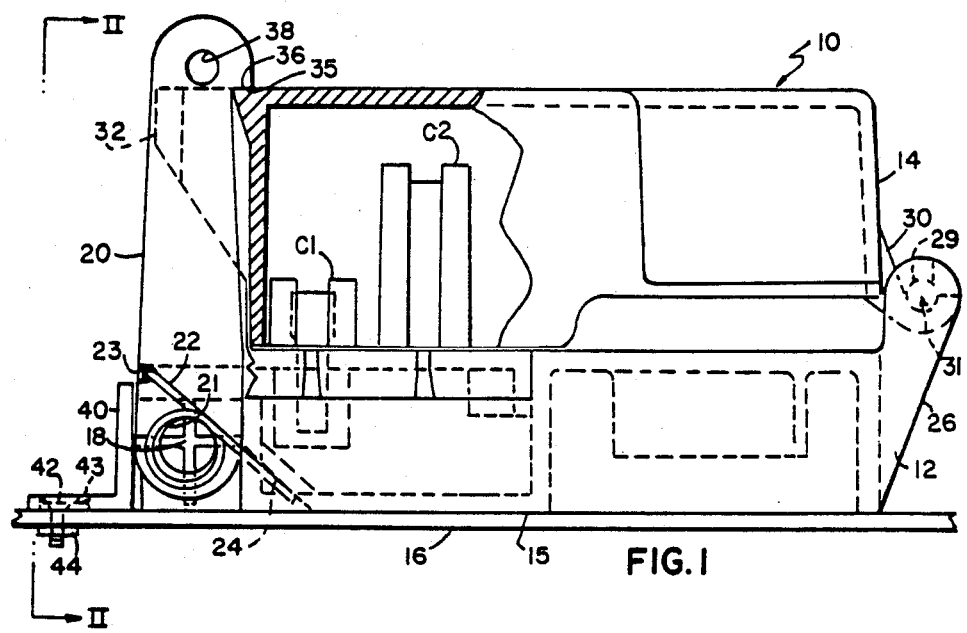
FIG. 1 is a side elevational view partially in section showing a telephone network interface device constructed in accordance with the teachings of the present invention.
Figure 2:
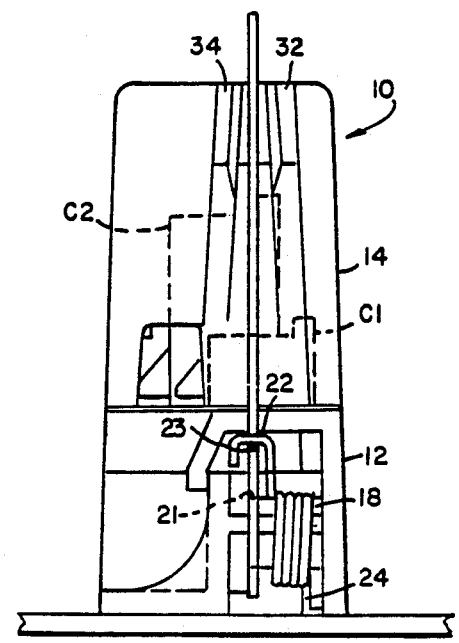
FIG. 2 is an end view of the telephone network interface security device taken along the lines II—II of FIG. 1.

Referring now to the drawing and in particular, to FIGS. 1 and 2, there is shown a telephone interface security device 10 comprising a base member 12 and a cover member 14. The base member 12 and the cover member 14 may be manufactured of plastic or other suitable material. When the cover is placed over the base as shown in FIGS. 1 through 3, they together form a compartment for the containment and storage of components C1 and C2. The components C1 and C2 are shown for descriptive purposes only and may be an RJ-11C jack and plug or other elements which are customarily provided in an interface of the type described.

The base member 12 has a bottom surface 15 which is affixed to a surface of the mounting panel 16 by screws or other fasteners.

The base member 12 is provided at one end with a boss 18 of circular configuration which extends outwardly from the base member to receive an elongated bar 20 by extending through an opening 21 in the elongated bar. The bar 20 is substantially rectangular in cross-section and is retained on the boss 18 by means of a spring 22 having one end connected into a notch 23 formed in the lower portion of the bar 20, the spring having a plurality of turns around the boss 18 and the opposite end of the spring being disposed in forced engagement with the sloping surface 24 of the base member 12 to thereby bias the upper portion of the bar 20 towards the unit comprising the cover 14 and the base 12.

At the opposite end of the base member 12, a pair of ears 26 and 28 extend upwardly from the base member at either side thereof, and a cylindrical pin 29 is formed between the ears 26 and 28. A rearwardly and downwardly extending arm 30 has a cylindrical opening formed therein for interfitting engagement with the pin 29. The combination of the ears 26 and 28 and the cylindrical pin 29 taken with the arm 30 and cylindrical opening 31 form a hinge permitting movement of the cover member 14 toward and away from the base member 12.

At the opposite end of the cover member 14, a pair of flanges 32 and 34 are formed extending one on either side of the elongated bar 20 with the bar in the first position as shown in FIGS. 1 through 3. The bar 20 is provided with a downwardly facing lip 35 which contacts a mating surface portion 36 of the cover member 14. It will further be noted, that with the bar 20 in the position shown in FIGS. 1 through 3, wall structure at the upper end of the bar 20 forms a cylindrical opening 38 extending through the thickness of the bar 20 and overlying the flanges 32 and 34.

A cylindrical opening 38 is intended to provide means for inserting a padlock or other locking member through the elongated bar 20 to prevent movement of the flanges 32 and 34 upwardly, permitting access to the interior of the cover member 14. As is evident from FIG. 1, with the elongated bar 20 in the position shown, movement of the cover member 14 about the hinge portion of the structure is prevented by the lip 35 and mating surface 36 as well as by any member retained in the opening 38 which consequently overlies the flanges 32 and 34.

Adjacent the elongated bar 20 and fastened to the mounting panel 16 is a stop member in the form of an angle bar 40. The angle bar 40 is slideably fastened to the wall 16 with fastener 42 and slotted opening 43 formed in the lower leg of the angle bar 40. The fastener 42 may be of any type well known in the art, having a head form which is of a non-standard configuration. That is, the head of the fastener requires a special tool or tools to rotate the fastener and loosen or tighten the fastener. While any fastener of this type may be employed, the present structure shows a threaded fastener which is engaged with a nut 44 retained on one side of the mounting panel 16 by spot welding or other means. As will be noted, the slotted opening 43 is of a dimension to permit the angle bar 40 to be moved toward and away from the base member 12 and elongated bar 20 when the fastener 42 is loosened. The angle bar 40 is therefore adjustable to a plurality of positions other than that shown in FIGS. 1, 2 and 3 while being maintained adjacent the mounting panel 16.

Figure 5:
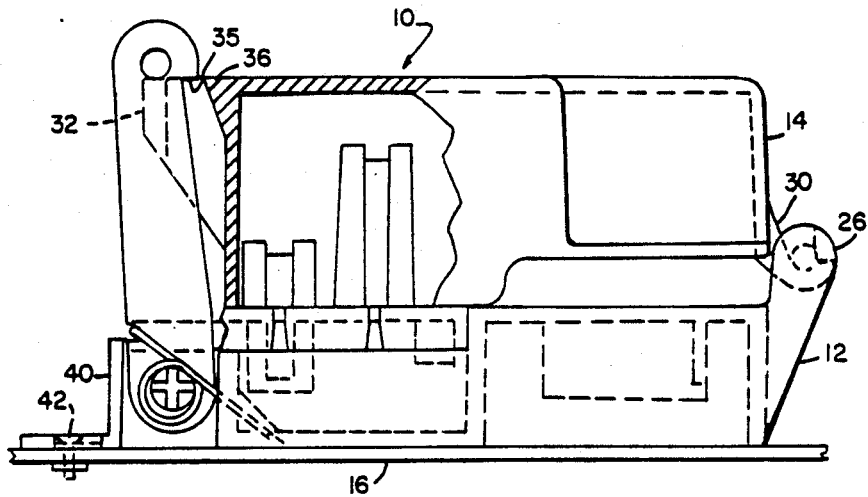
FIG. 5 is a side elevational view similar to FIG. 4 but showing operation of the device for customer access.
Figure 6:
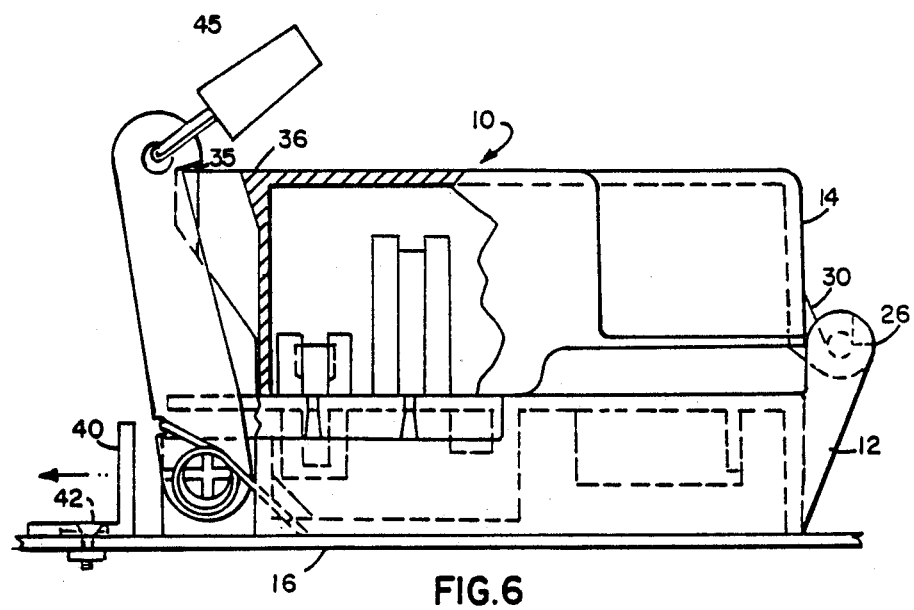
FIG. 6 is a side elevational view similar to FIGS. 4 and 5 showing operation of the device for telephone company access.

Referring now to FIGS. 4, 5 and 6, and in particular to FIG. 4, the device 10 is shown as in FIGS. 1 through 3 with a padlock 45 in place, and the angle bar 40 situated such that it is spaced from the bar 20 by a relatively small distance allowing limited movement between the angle bar 40 and the bar 20. In this first position of the elongated bar 20, unauthorized opening of the cover member 14 is prevented in that the flanges 32 and 34 will not move upwardly past the padlock 45 and the upper mating surface 36 of the cover member 14 will not move beyond the lip 35.

When the customer desires access to the components C1 or C2 (or other components) under the cover member 14, the padlock is removed as shown in FIG. 5 and the space between the elongated bar 20 and the angle bar 40 is sufficient to allow the bar 20 to be moved until the lip 35 no longer engages the mating surface 36 with the elongated bar contacting the angle bar 40 in the second position. It is therefore evident, that in the second position, the customer has access to the components which he may desire for testing, etc.

When it becomes necessary for the telephone company to have access to the components within the cover member 14, the fastener 42 is loosened and the angle bar 40 is moved away from the bar 20 such that the angle bar 20 may be moved to the third position. As shown in FIG. 6, with the lock 45 remaining in place, the angle bar 40 has been moved to a position wherein the elongated bar 20 can now be rotated to clear the flanges 32 and 34 past the padlock 45. Thus in this third position, access is had to the elements under the cover member 14 without removal of the padlock and the telephone company employee has the ability to service the elements within the cover 14 without having to contact the customer for removal of the padlock 45.

While the invention has been shown as directed to a single device 10, it is possible that with a number of telephone lines in a single building, a plurality of boxes or devices 10 would be installed in line having a single angle bar 40 allowing the telephone company to access each box while providing each customer with his own unit having a padlock 45 which only he could remove to access the various components. Thus, each customer has the ability to maintain security over his own telephone equipment while the telephone company has access to the entire set of interface boxes or storage containers within a building.

Figures 7, 10:
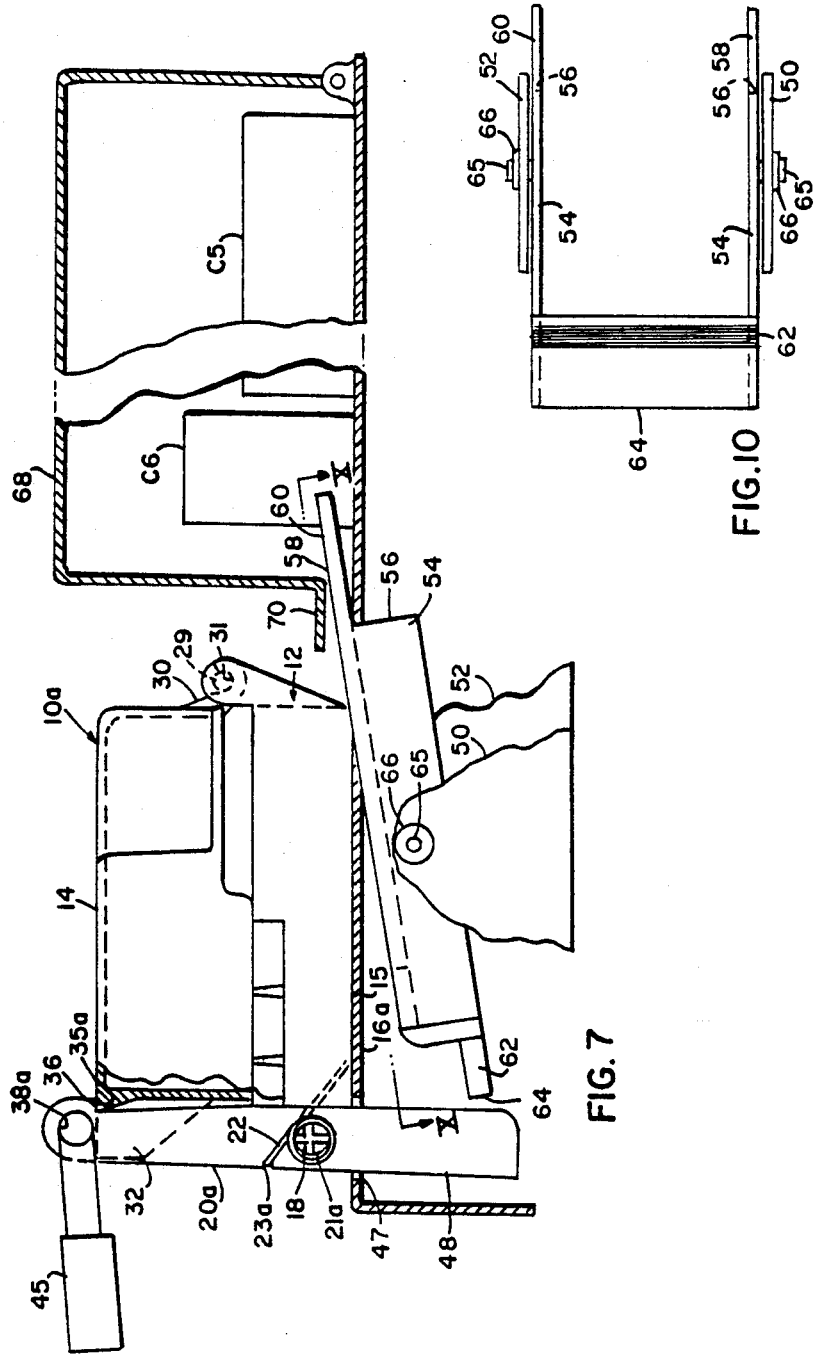
FIG. 7 is a side elevational view similar to FIG. 4 showing an alternate embodiment of the present invention.
FIG. 10 is a view taken along the lines X—X of FIG. showing details of an element in the structure of FIGS. 7 through 9.
Figure 8:
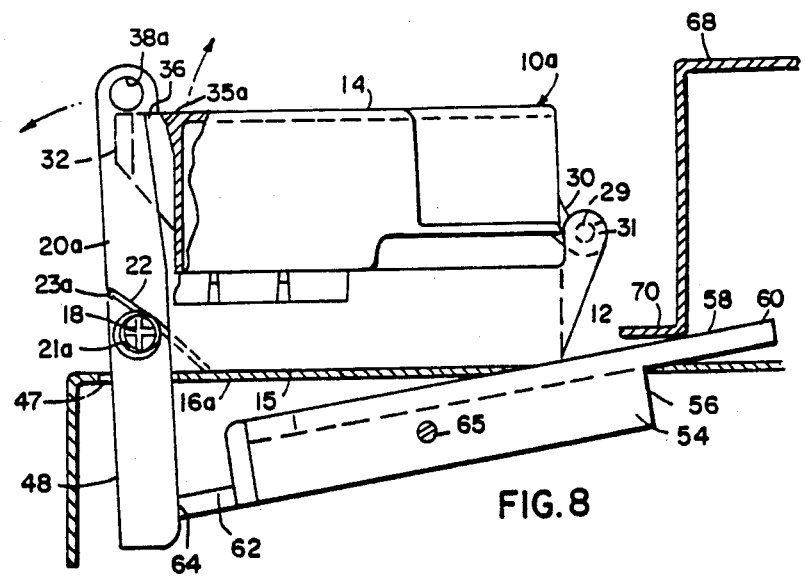
FIG. 8 is a side elevational view similar to FIG. 7 but showing operation of the device for customer access.
Figure 9:
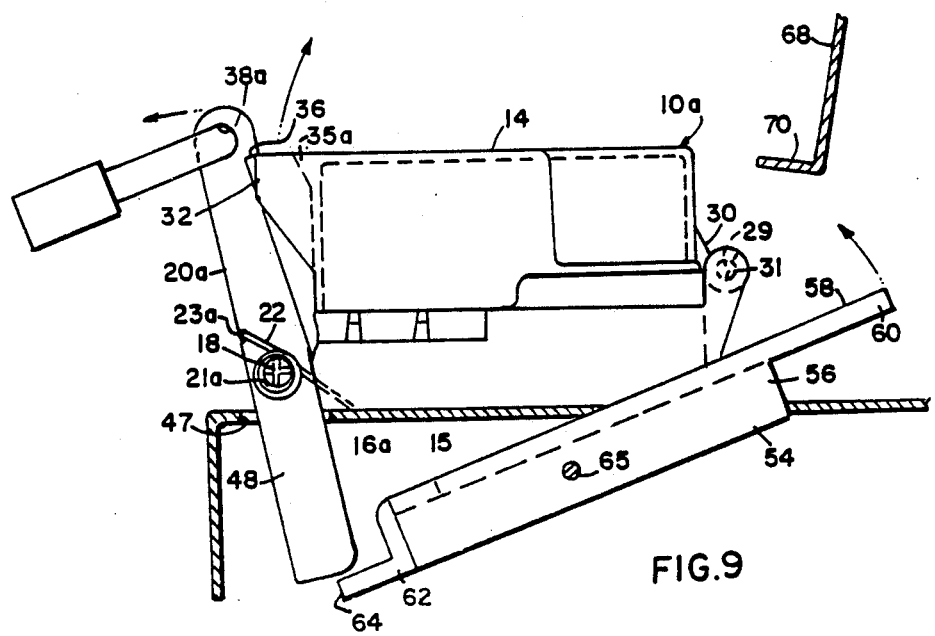
FIG. 9 is a side elevational view similar to FIGS. 7 and 8 showing operation of the device for the telephone company access.

Referring now to FIGS. 7 through 10, there is shown an alternate embodiment of the present invention in which like elements have been given like reference numerals. In those figures, a device 10a comprises a base member 12 and a cover member 14 which contain components similar to those of the device 10 shown in FIGS. 1 through 6. However, the device 10a is mounted on a mounting panel 16a which has an opening 47 formed therein. An elongated bar 20a is provided in place of the previously described bar 20, and has a portion 48 which extends downwardly through the opening 47 as best seen in FIGS. 7 through 9. The elongated bar 20a has a lip 35a, a cylindrical opening 38a, a notch 23a, an opening 21a formed therein which serves the identical function of the lip 35, cylindrical opening 38, notch 23 and cylindrical opening 21 as described with reference to the elongated bar 20. In the present embodiment, an array of devices 10 are located side by side in a large container having a pair of side walls 50 and 52, a portion which is shown in FIGS. 7 and 10. A sheet metal member is formed having a pair of elongated arms 54 and 56 which have a strike surface 58 and 60 at one end thereof, and stop means in the form of an angular segment 62 at the opposite end thereof. The angular segment 62 connects the arms 54 and 56 and has a surface 64 for contacting any of a number of elongated bars 20a which are located to extend through openings 47 in the mounting panel 16a. Each of the arms 54 and 56 are connected by fastening pins 65 and 66 to the side panels 50 and 52 for rotation of the arms about the pins.

Adjacent the hinged portion of the device 10a, there is located a security cover 68 which is attached to the mounting panel 16a by a hinge 69, the cover 68 serving to enclose components C5 and C6 which are intended to be accessible only by telephone company personnel, the cover 68 has an edge 70 which is formed substantially parallel to the mounting panel 16a and which extends over the arms 56 and 54 and is aligned with the strike surfaces 58 and 60 when in the closed position as shown in FIGS. 7 and 8.

In the present embodiment, the security cover 68 is retained in the closed position as shown in FIGS. 7 and 8 by fasteners (not shown) similar to the fastener 42, that is a fastener which requires a special tool or tools to loosen or tighten the fastener to gain access to the component retained by the cover 68.

In operation, the device 10a is shown in FIG. 7 with a padlock 45 in place and the cover 68 in the closed position whereby the elongated arms 54 and 56 are retained in the position shown. The surface 64 is spaced from the bar 20a, however the padlock 45 prevents unauthorized opening of the cover member 14 in that the flanges 32 and 34 will not move upwardly past the padlock 45 and the upper mating surface 36 of the cover member will not move beyond the lip 35a. In this position, the arms 54 and 56 are retained in the position shown in FIG. 7, by virtue of the strike surfaces 58 and 60 contacting the edge 70 of the security cover 68.

When the customer desires access to the components within the cover 14, the padlock is removed as shown in FIG. 8 and the space between the elongated bar 20a and the surface 64 of the angular segment 62 allows the bar 20a to be moved until the lower portion 48 of the bar contacts the surface 64. As shown in FIG. 8, movement of the bar 28 through the space provided is sufficient to allow the lip 35a to no longer engage the mating surface 36 and in this second the position, the customer has access to the components which he may desire to test or service.

As shown in FIG. 9, with the padlock 45 in place, when it becomes necessary for the telephone company personnel to service the equipment retained under the cover 68 and/or gain access to the components within the cover 14, opening of the cover 68 releases the edge 70 from contact with the strike surfaces 58 and 60 and the elongated arms 54 and 56 rotate t move the angular segment 62 and the surface 64 away from the lower portion 48 of the arm 20a and the arm is rotated to the position shown in FIG. 9 wherein the cover 14 may be opened.

The embodiment shown in FIGS. 7 through 9 has the advantage of providing a simple structure which allows telephone company personnel to override the customer security device and in which the device subsequently returns to the secure mode without the performance of a number of steps by telephone personnel or the need for a plurality of attachable parts which may be lost and subsequently not installed. Further, the elongated arms 56 and 54 and the angular segment 62 are substantially obscured from view, and therefore the arrangement is less susceptible to tampering by someone desiring access to the equipment.

It is apparent that modifications and changes may be made within the spirit and scope of the present invention. It is our intention, however, only to be limited by the scope of the appended claims.

As our invention, we claim:

1. A telephone network interface security device comprising:
    a storage container formed of a base portion having a bottom surface affixed to a mounting surface and a cover portion disposed on the upper surface of said base portion, said base portion and said cover portion together forming a compartment for the containment and storage of components;

elongated latch means pivotably connected to one end of said base portion and extending upwardly in a first position adjacent said cover portion;

hinge means connecting said cover portion to said base portion at the, opposite end of said base portion;

flange means disposed on said cover portion extending adjacent at least one side of said latch means;

securing means disposed on said latch means above said flange means with said latch means in a first position, said latch means further having a downwardly facing lip extending over said cover portion with said latch means in said first position;

a stop means spaced from said latch means a sufficient distance to allow said latch means to be pivotably moved away from said cover portion to a second position wherein said downwardly facing lip does not extend over said cover portion and said latch means contacts said stop means with said securing means disposed above said flange means, and said stop means being movable away from said latch means to provide a space between said stop means and said latch means whereby said latch means is pivotably movable to a third position wherein said securing means is not disposed above said flange means.

2. A telephone network interface security device as set forth in claim 1 which further includes spring means disposed on said latch means for biasing said latch means toward said cover portion.

3. A telephone network interface security device as set forth in claim 1 wherein said stop means comprises an angle member slideably retained on said wall surface for movement toward and away from said latch means.

4. A telephone network interface security device as set forth in claim 1 wherein said flange means comprises a pair of flange members extending in parallel relation one on either side of said latch means.

5. A telephone network interface security device as set forth in claim 1 wherein said latch means comprises an elongated bar having said downwardly facing lip formed adjacent the upper end thereof.

6. A telephone network interface security device as set forth in claim 1 wherein said securing means comprises a wall structure forming an opening in said latch means for receiving a portion of a lock or other device overlying said flange means whereby said flange means is prevented passage by said opening with said lock or other device located in said opening.

7. A telephone network interface security device as set forth in claim 5 wherein said flange means comprises a pair of flange members extending in parallel relation one on either side of said elongated bar.

8. A telephone network interface security device as set forth in claim 7 wherein said securing means comprises a wall structure in said bar, said wall structure forming an opening through said bar disposed above said pair of flange members for receiving a portion of a lock or other device overlying said flange members, whereby said flange members is prevented passage by said opening with said lock or other device disposed in said opening.

9. A telephone network interface security device as set forth in claim 8 wherein said stop means comprises an angle member slideably retained on said mounting surface for movement toward and away from said elongated bar.

10. A telephone network interface security device as set forth in claim 9 which further includes a spring interconnected between said base portion and said elongated bar for biasing said elongated bar toward said cover portion.

11. A telephone network interface security device as set forth in claim 1 wherein said latch means comprises:

an elongated bar and extends downwardly below said one end of said base portion to which it is pivotably connected, through an opening formed in said mounting surface, and said stop means is disposed on one end of an elongated arm pivotably mounted for rotation thereof;

whereby said stop means is movable toward and away from said elongated bar through rotation of said elongated arm.

12. A telephone network interface security device as set forth in claim 11 further comprising a cover member overlaying said mounting surface and having an edge thereof disposed adjacent said mounting surface and said opposite end of said base portion when in the closed position, and spaced from said mounting surface and said opposite end of said base portion when in the open position;

said elongated arm further comprising a strike surface disposed at the opposite end of said elongated arm from said stop means;

said strike surface being aligned for contact with said edge of said cover member in the closed position and being movable when said cover member is in the open position to allow rotation of said arm and thereby provide movement of said stop means away from said latch means.

13. A telephone network interface security device as set forth in claim 12 wherein said flange means comprises a pair of flange members extending in parallel relation one on either side of said latch means.

14. A telephone network interface security device as set forth in claim 13 wherein said downwardly facing lip is formed adjacent the upper end of said elongated bar.

15. A telephone interface security device as set forth in claim 14 wherein said securing means comprises a wall structure forming an opening in said latch means for receiving a portion of a lock or other device overlying and flange means whereby said flange means is prevented passage by said opening with said lock or other device in said opening.

* * * * *